United States Patent [19]

Frister

[11] 4,383,215
[45] May 10, 1983

[54] DIRECT-CURRENT, SELF-CONTAINED, MOBILE POWER SUPPLY SYSTEM

[75] Inventor: Manfred Frister, Schwieberdingen, Fed. Rep. of Germany

[73] Assignee: Robert Bosch GmbH, Stuttgart, Fed. Rep. of Germany

[21] Appl. No.: 288,411

[22] Filed: Jul. 30, 1981

[30] Foreign Application Priority Data

Sep. 23, 1980 [DE] Fed. Rep. of Germany ....... 3035819

[51] Int. Cl.³ .......................... H02P 9/10; H02P 9/30
[52] U.S. Cl. ........................................ 322/63; 322/28; 322/64
[58] Field of Search ....................... 322/28, 63, 64, 65, 322/66

[56] References Cited

U.S. PATENT DOCUMENTS

| | | | |
|---|---|---|---|
| 3,510,752 | 5/1970 | Raver et al. | 322/64 X |
| 3,512,706 | 5/1970 | Larson et al. | 322/64 X |
| 3,863,137 | 1/1975 | Mishima et al. | 322/64 X |
| 4,004,211 | 1/1977 | Takao et al. | 322/63 |
| 4,105,963 | 8/1978 | Dobranis | 322/63 X |

Primary Examiner—R. J. Hickey
Attorney, Agent, or Firm—Frishauf, Holtz, Goodman & Woodward

[57] ABSTRACT

To prevent over-excitation upon high-speed operation of a compound wound alternator, the shunt field, connected in standard manner to a voltage regulator, has an additional shunt field winding placed on the core, the additional shunt field winding being controlled from the output of the alternator and generating a magnetic field counter the field due to the compound winding if an auxiliary counter field voltage regulator senses that the output voltage of the alternator rises above a predetermined value.

6 Claims, 1 Drawing Figure

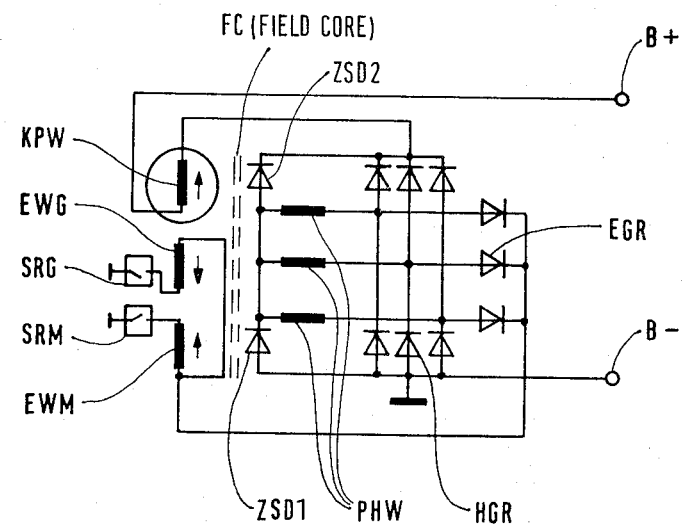

DIRECT-CURRENT, SELF-CONTAINED, MOBILE POWER SUPPLY SYSTEM

The present invention relates to a direct-current, mobile, self-contained power supply system, and more particularly to a power supply system in which an alternator supplies power to a rectifier to charge a battery, typically for the on-board electrical network of a vehicle, a boat, or the like.

BACKGROUND

In many types of self-contained networks, for example the electrical networks of automotive vehicles, it is customary to wind the generator to include a compound winding. The compound winding has load current flowing therethrough. Additionally, a voltage regulator is provided to control the output voltage of the generator to an appropriate level so that the battery, which floats on the network, is maintained in a continuous state of charge. If the output voltage of the alternator drops, the voltage regulator is controlled to conduction to permit current flow through an exciter field winding. This causes a rise in the output voltage of the alternator and, when the output voltage thereof exceeds a predetermined level, the voltage regulator causes current to the exciter field winding to be interrupted, so that the voltage will drop. This cycle repeats in short intervals, thus maintaining the output voltage of the alternator essentially constant. The voltage of the generator, thus, is maintained at the predetermined level, independent of the speed of the alternator or the load placed thereon, or the load state of the battery connected to the network. In high-power alternators, an additional compound winding is customary, so that the currents through the shunt field exciter windings can be held at a lower level. This permits use of voltage regulators of lower current carrying capacity, and hence lesser switching losses in the overall system. The use of the compound winding permits higher loading of the alternator, since the load current flows through the compound winding, thus increasing the excitation as the load on the alternator increases. Compound windings, however, when used in vehicular applications in which the alternator is driven at widely varying speeds have the disadvantage that at extremely high speeds, with even moderate loading on the alternator, the alternator can be excessively excited so that, even if the shunt-connected voltage regulator has disconnected excitation energy to the shunt winding, the output voltage of the alternator rises to a level which may cause damage to the battery connected to the network.

THE INVENTION

It is an object to provide a self-contained electrical system which permits the use of alternators with compound windings, while protecting load elements connected thereto, such as a battery, against over-voltage conditions, for example to prevent over-charging, or damage to semiconductor equipment.

Briefly, the shunt excitation winding is formed in two parts; one of the parts is normally connected to a voltage regulator which energizes the winding if the voltage drops below a predetermined level in accordance with standard practice; the other winding, however, is connected to a voltage regulator which responds if the voltage level of the alternator rises above a predetermined value, for example due to excessive excitation arising from load current flowing through the compound winding, the second portion of the shunt exciter winding providing a field which is opposite that derived from the compound winding in order to maintain the overall induction field to which the armature is exposed at the level required for proper output voltage operation on the alternator.

The two winding portions can be wound in opposite direction of winding or, alternatively, can be appropriately reversely connected.

The system has the advantage that compound-wound alternators can be used with the advantages thereof without, however, causing excessive output voltages from the alternator at high speeds and high loading thereof. Thus, the output voltage of the alternator can always be maintained at a predetermined value.

In accordance with a preferred feature of the invention, and which utilizes the available winding space for the windings, all three excitation windings, that is, the compound winding and the two shunt field windings, are placed on the same winding space normally allotted to an alternator of the respectively rated output. This permits use of voltage regulators of standard mass production with current carrying capabilities less than would be required if the alternator of the same size and rating had only a single shunt field.

The arrangement is particularly suitable for trucks, buses, and other heavy vehicles which place a heavy electrical demand on the alternator and which, further, can be operated under highly variable conditions of engine speed, and where the load placed on the engine of the vehicle by the alternator is small with respect to the overall power output required from the engine, so that high loading of the alternator, even at high speeds, causes little change in operating speed of the engine, and hence of the alternator.

DRAWING

The single figure is a highly schematic illustration of the power system in accordance with the invention, applied to an automotive on-board vehicular network suitable, for example, for a truck.

The alternator is constructed in known manner, with three phase windings PHW forming the armature, to which an output load current rectifier HGR is connected. The main rectifier HGR is connected as a three-phase bridge, and provides output power between two terminals B+ and B−, for example for connection to a battery and to load circuits. The overall efficiency is improved by the addition of common diodes ZSD1 and ZSD2.

The B+ terminal of the rectifier is connected to the cathodes of the rectifier diodes, and the B− terminal is connected to the anodes of the rectifier diodes. Serially connected between the cathodes of the rectifier diodes and the B+ terminal is a compound winding KPW. The armature phase windings PHW are further connected to an exciter rectifier EGR which has its output connected to a main exciter winding EWM which is serially connected to a main voltage regulator SRM to form a shunt field connection in standard automotive-type electrical power supply mode.

In accordance with the invention, a further counter field winding EWC is provided, connected to the exciter rectifier EGR, and in turn serially connected to a counter voltage regulator SRC. The counter field EWC is likewise wound in shunt mode.

Operation: Upon initial connection, the generator will build up output voltage due to remanent magnetism. The main voltage regulator SRM will be conductive, so that current will flow through the main exciter winding EWM, causing rapid build-up of voltage of the alternator. When the output voltage of the alternator has a predetermined value, the main voltage regulator SRM interrupts current flow through the main exciter field EWM. If no load is connected to the output terminals B+, B−, the voltage will not rise any further. If a load is connected between the terminals B+, B−, current will flow through the compound winding KPW and an excitation field will be derived due to this current flow. The excitation derived from the compound winding depends on the speed of the alternator and the output current. The compound winding is so designed that, within normal speed range, even upon high loading of the alternator, that is, at highest output current, excessive excitation will not result, so that the output voltage of the alternator can be controlled by selective closing and opening of the switch within the main voltage regulator SRM. At very high speeds, however, and with high loading, excessive excitation of the alternator may result. In accordance with the invention, this excessive voltage is sensed by the counter voltage regulator SRC which will become conductive and permit current flow through the counter excitation shunt field EWC, causing a reduction in the overall field to which the armature windings PHW will be exposed, by providing a counter magnetic force. The counter current thus reduces the net magnetic field inducing electrical energy in the armature winding PHW. This causes a drop of the output voltage of the alternator.

In accordance with a preferred feature of the invention, all three windings KPW, EWM and EWC are applied to the same field core FC of the alternator; as a minimum, the two shunt field windings EWM and EWC should be applied to the same core or core portions. The winding space and the respective winding slots for all three windings can be the same as for alternators which do not have a compound or a counter shunt field winding and of similarly rated power output.

I claim:

1. Direct-current power supply system for self-contained electrical networks, particularly for mobile applications, having
   a generator having armature windings (PHW);
   a compound winding (KPW) serially connected to the output of the generator and having load current flowing therethrough;
   a main voltage regulator (SRM) connected to the output of the generator and sensing when the voltage of the generator drops below a predetermined level;
   and comprising, in accordance with the invention,
   a two-part exciter winding (EWM, EWC), the main voltage regulator (SRM) being connected to one of said winding parts (EWM) and controlling current flow therethrough to provide an excitation field for the generator if its voltage drops below the predetermined level;
   and an over-voltage regulator (SRC) connected to the output of the generator, said over-voltage regulator being connected to and controlling current flow through the second exciter winding (EWC) to provide an excitation field for the generator counter the direction of the magnetic field due to current flow in the compound winding (KPW), the over-voltage regulator being responsive to output voltages of the generator above a pre-set value.

2. System according to claim 1, wherein the two winding parts of the exciter winding are wound in respectively opposite directions of winding.

3. System according to claim 1, wherein the main voltage regulator is connected to control interruption of current flow through the main exciter winding part (EWM) if the output voltage of the generator rises above said predetermined level.

4. System according to claim 1 or 3, wherein the over-voltage regulator is connected to control current flow through the second counter flow exciter winding part (EWC) if the output voltage of the generator exceeds a second preset level.

5. System according to claim 1, wherein the two parts of the exciter winding (EWM, EWC) are applied to the same core (FC).

6. System according to claim 1, wherein the two parts of the exciter winding (EWM, EWC) and the compound winding (KPW) are wound on the same core (FC).

* * * * *